(12) United States Patent
Khan et al.

(10) Patent No.: US 10,392,527 B2
(45) Date of Patent: Aug. 27, 2019

(54) POLYVINYL ALCOHOL AND ETHYLENE VINYL ALCOHOL COPOLYMER BARRIER COATINGS

(71) Applicant: SUN CHEMICAL CORPORATION, Parsippany, NJ (US)

(72) Inventors: Asad Khan, Essex (GB); Safraz Khan, South Croydon (GB); Michael Leonard, Kent (GB); Farid Azizian, Oxfordshire (GB)

(73) Assignee: SUN CHEMICAL CORPORATION, Parsippany, NJ (US)

( * ) Notice: Subject to any disclaimer, the term of this patent is extended or adjusted under 35 U.S.C. 154(b) by 174 days.

(21) Appl. No.: 14/769,353

(22) PCT Filed: Feb. 26, 2014

(86) PCT No.: PCT/US2014/018533
§ 371 (c)(1),
(2) Date: Aug. 20, 2015

(87) PCT Pub. No.: WO2014/134110
PCT Pub. Date: Sep. 4, 2014

(65) Prior Publication Data
US 2016/0024326 A1  Jan. 28, 2016

Related U.S. Application Data

(60) Provisional application No. 61/769,814, filed on Feb. 27, 2013.

(51) Int. Cl.
| *C09D 5/00* | (2006.01) |
| *C09D 129/04* | (2006.01) |
| *C09D 7/20* | (2018.01) |

(52) U.S. Cl.
CPC ............. *C09D 129/04* (2013.01); *C09D 5/00* (2013.01); *C09D 7/20* (2018.01)

(58) Field of Classification Search
None
See application file for complete search history.

(56) References Cited

U.S. PATENT DOCUMENTS

| 4,590,131 A * | 5/1986 | Yazaki ................... C08L 23/08 |
| | | 428/36.6 |
| 5,268,214 A | 12/1993 | Charbonneau |
| 5,328,724 A | 7/1994 | Deak |
| 2007/0178246 A1 | 8/2007 | Biro et al. |
| 2007/0208120 A1 | 9/2007 | Lambert et al. |
| 2010/0323189 A1* | 12/2010 | Illsley ...................... B32B 7/12 |
| | | 428/331 |
| 2012/0231188 A1 | 9/2012 | Illsley et al. |

FOREIGN PATENT DOCUMENTS

| CN | 101389717 A | 3/2009 |
| EP | 0761739 A1 | 3/1997 |
| JP | H09124841 | 5/1997 |
| JP | 2003-277677 A | 10/2003 |
| JP | 2006282947 A | 10/2006 |
| JP | 2008266522 A | 11/2008 |
| WO | WO-2010/095139 A1 | 8/2010 |

OTHER PUBLICATIONS

Chinese Office Action issued in Chinese Application No. 201480009982. 9, dated Sep. 23, 2016.
International Preliminary Report issued in PCT/US2014/018533, dated Sep. 1, 2015.
International Search Report issued in PCT/US2014/018533, dated May 23, 2014.
Japanese Office Action issued in Chinese Application No. 2015-560266, dated Nov. 27, 2017. (with English Translation).
Office Action issued in European Counterpart Application 14 757 336.4 dated Sep. 10, 2018.
Office Action issued in Japanese Counterpart Application 2015-560266 dated Sep. 26, 2018.

* cited by examiner

*Primary Examiner* — Sheeba Ahmed
(74) *Attorney, Agent, or Firm* — Charles C. Achkar; Ostrolenk Faber LLP.

(57) ABSTRACT

Barrier coatings with efficacy against oxygen and nuisance substances are described that comprise lower molecular weight PVOH and EVOH co-polymers, when coated on flexible substrates. Coating formulations comprising these co-polymers advantageously tolerate moderate to higher proportions of organic solvents in aqueous blends, and thus produce faster drying coating formulations.

21 Claims, 1 Drawing Sheet

POLYVINYL ALCOHOL AND ETHYLENE VINYL ALCOHOL COPOLYMER BARRIER COATINGS

CROSS REFERENCE TO RELATED APPLICATIONS

The present application is a § 371 National Phase application based on PCT/US2014/018533 filed Feb. 26, 2014, which claims the benefit of U.S. Provisional Application Ser. No. 61/769,814, filed Feb. 27, 2013, all of which applications are incorporated herein by reference in their entirety and for all purposes.

FIELD OF THE INVENTION

The present invention relates to low molecular weight polyvinyl alcohol (PVOH) and ethylene vinyl alcohol (EVOH) co-polymer solutions that can tolerate higher proportions of organic solvents, in particular lower alcohols, in aqueous blends that produce faster drying barrier coating formulations.

BACKGROUND OF THE INVENTION

Conventionally, polymers that contain a high hydrogen bonding group with high hydrophilicity in their molecules, represented by polyvinyl alcohol (PVOH) and ethylene vinyl alcohol (EVOH) are used as gas barrier polymers. PVOH and EVOH are considered water-soluble polymers. Additions of up to around 20-30% ethanol or propanol to aqueous coating formulations containing PVOH and/or EVOH polymers are normal and provide longer cold storage stability and help increase the drying speed of these coatings formulations. It is also desirable to have an even higher content of lower alcohol or other organic solvents in such aqueous coating solutions in order to improve their stability and drying speed.

U.S. Pat. No. 7,157,147 B2 describes a gas barrier film comprising a thermoplastic resin film and gas barrier layer with a composition of a hydrolysate of a silicon dioxide, a polyvinyl alcohol base resin. A part of the polyvinyl alcohol was dissolved in a mixed solvent of 70 parts by weight water and 30 parts by weight ethanol.

CN 2010-1068086 discloses a barrier coating comprises a highly hydroxlyated polyvinyl alcohol. As part of the composition, the solvent is 1-25 parts by weight of the final composition. The solvent can either be methanol, ethanol, isopropanol, sec-butanol and/or isobutanol.

WO 2007034943 describes a coating comprising both PVOH and an ethylene-maleic anhydride copolymer being applied to a nylon film followed by heat treatment (at up to 220° C.). Based on the oxygen barrier reported, this organic-based coating would fall outside the terms defined by the parametric expression describing the 'barrier improvement factor'.

JP 11-246729 describes compositions comprising PVOH, poly(acrylic acid) and clay and discloses how they are prepared under high pressure dispersion.

EP 1548074 describes a gas barrier coating material which comprises polyvinyl alcohol (A) and an ethylene/maleic acid copolymer (B) at an (A)/(B) weight ratio of 50/50 to 10/90 and contains at least one metal compound (D) selected from the group consisting of hydroxides, oxides, halides, carbonates, sulfates, nitrates, sulfites, and acetates of at least divalent metals selected from the group consisting of Mg, Ca, Al, Fe, Co, Ni, and Cu in an amount of 0.05 to 30% by equivalent based on the carboxyl contained in the copolymer (B); and a gas barrier laminate comprising a gas barrier layer made from the coating material and a plastic substrate wherein the gas barrier layer adheres to the plastic substrate either directly or via an undercoat.

EP 1666637 discloses a gas-barrier coating material capable of giving a packaging material which, when formed so as to have a thin gas-barrier layer. The gas-barrier coating material composition comprises as essential ingredients an ethylene/vinyl alcohol copolymer (A) obtained by saponifying an ethylene/vinyl acetate copolymer, a lamellar inorganic compound (B), and a solvent, wherein the sum of the ingredients (A) and (B) is 1 to 30 wt. % based on the composition and the proportion of (A)/(B) by weight is from 30/70 to 50/50.

JP2007136984 A describes EVOH-Clay composite coatings applied to a base layer having an anchor coat, prior to adhesive lamination to a second plastic film. The examples describe both polypropylene and polyester base webs, both requiring the use of an anchor coat prior to application of the EVOH-Clay composite. Although this reference notes a range of oxygen barrier of 1-7 in its claims there is no comment on the bond strengths achieved. Furthermore, this reference states that as the clay content increases, the adhesive lamination bond strength decreases.

WO2012168433 describes a packaging material made of cellulose, bearing a coating on the inner food contact surface based on an aqueous composition of poly vinyl alcohol and a cross linking agent optionally containing a platey or spherical shaped filler. The coating is said to provide barrier to hydrophobic compounds such as mineral oils typically found in recycled paper fibers used in the manufacture of recycled carton for food packaging.

WO 2013/017857 discloses a barrier composition for recycled paper based food packaging based on an alcohol based (PVOH is used to exemplify this) binder and an inorganic particulate. The barrier composition is claimed to prevent the migration of mineral oils, typically those found in recycled paper fibers used in recycled carton for food packaging.

WO2013066246A1 discloses a film or coating for preventing migration of substances from paper or board containing recycled fibers, wherein said film or coating is a polymeric film or coating comprising hemicellulose, wherein said film or coating is arranged to form a migration barrier layer.

In summary, none of the prior art described above discloses (gas) barrier coatings comprising poly vinyl alcohol and/or ethylene vinyl alcohol co-polymers dissolved in aqueous mixtures that contain at least 45% organic solvents such as lower alcohols.

SUMMARY OF THE INVENTION

The present invention provides a barrier coating composition comprising a poly vinyl alcohol and/or ethylene vinyl alcohol co-polymer dissolved in an aqueous mixture that comprises at least 45% one or more organic solvent.

The present invention also provides a method of making a coating that forms a barrier against gases and/or nuisance substances, comprising dissolving a poly vinyl alcohol and/or or ethylene vinyl alcohol co-polymer in an aqueous mixture that comprises at least 45% one or more organic solvent.

The present invention further provides a method of coating an article with a barrier against gas and nuisance substances comprising printing the barrier coating composition of the present invention on said article.

The present invention also provides an article coated with the barrier coating composition of the present invention.

These and other objects, advantages, and features of the invention will become apparent to those persons skilled in the art upon reading the details of the methods and formulations as more fully described below.

DETAILED DESCRIPTION OF THE INVENTION

PVOH and EVOH co-polymers are available at varying molecular weights, but there are very few with MWs less than ~10,000 or aqueous solution viscosities less than 3 mPa·s at 4% concentration (industry standard way of specifying PVOH viscosity grade). Such polymers not surprisingly show lower viscosity at a given solids content, but quite surprisingly tolerate dilution with significantly higher levels of organic solvents—such as lower alcohols—up to and often beyond 50%. This combination of properties enables the formulation of coatings with higher polymer solids contents than conventional products and unusually high levels of alcohol diluents. Both of these features combine to give faster drying coatings when applying similar dry film weights to the more established formulations based on higher molecular weight grades with equivalent desirable properties such as oxygen and carbon dioxide gas barriers as well as barriers to a broad spectrum of nuisance substances. "Nuisance substances" are defined as materials present on the reverse side of the packaging film to a foodstuff, or present within the coated film assembly itself, that will, or potentially could, migrate into the packaged foodstuff (human or animal) or other material of value under normal or abnormal (e.g. very high or low temperature) conditions of transportation and storage. Examples of nuisance substances are energy-curable monomers and oligomers, photoinitiators and reaction products from photoinitiators exposed to ultraviolet light during a curing process, amine synergists, antioxidants, plasticizers, resin or polymer fragments, oils such as mineral oils and vegetable oils, aromas that would spoil the flavor of food, and any material that would alter adversely the organoleptic or aesthetic properties of a packaged foodstuff. Further examples of nuisance substances would include, but not be limited to, odiferous gases and other potentially migratable materials with the property of altering the fragrance or fitness-for-purpose of a cosmetic or pharmaceutical product. The result is fast drying, high solids gas and/or nuisance substance barrier coatings suitable for application from printing processes, preferably common impression (often abbreviated to "CI") flexographic printing presses, in-line with printing inks to produce printed articles with these barrier properties for various types of packaging (e.g. food packaging) in a single operation.

Advantages of the present invention include the following:

Good to higher solids solutions at flexo and gravure application viscosities;
Equivalent dry film weights applied from lower wet film weights;
Higher tolerance of lower alcohols (e.g. Solutions that tolerate ~45% or more lower alcohols, for example ethanol, 2-propanol, 1-propanol);
Better wetting of low surface energy plastic films;
Use of commercially available PVOH and EVOH co-polymers;
Can be used in-line with solvent-based inks applied on common impression flexo presses. In-line denotes in the same printing and coating operation such that the whole process is completed between feeding the bare substrate into the press and re-reeling the coated and printed substrate at the end of the press;
Potentially deliverable as a single pack (no press-side mixing before use);
Faster drying, more productive coatings; and
No compromise in barrier properties despite the lower molecular weight polymers and raised alcohol solubility.

Careful selection of commercially available polymers has led to the finding that aqueous solutions preferably containing 45% or more organic solvents such as lower alcohols (e.g. ethanol, Industrial Methylated Spirits (IMS, TSDA etc), 1-propanol, 2-propanol, etc.) can be made, preferably by using PVOH and/or EVOH with a molecular weight less than 10,000. Lower alcohols is a term used herein to define hydroxyl containing organic compounds, more specifically monohydric alcohols, bearing just one hydroxyl group with a carbon number of between C1 and C4, more preferably between C2 and C4 and even more preferably between C2 and C3. Specifically methanol (C1) is a less desirable alcohol due to its toxicological properties, but ethanol (C2), propanols (C3,1-propanol and 2-propanol) and butanols (C4, including 1-butanol, 2-butanol and tert butanol), and mixtures thereof may all be useful solvents in this invention.

One skilled in the art will appreciate that such coatings used in the application of food packaging would preferably not cause a taint or odor and thus C4 alcohols are less preferred than other alcohols for this reason. Also higher monohydric alcohols with carbon numbers between C5 and C9, and their isomers and blends, may be useful in minor quantities preferably less than 5%, more preferably less than 2%, to suppress foaming tendencies as is well known to those skilled in the art of aqueous coating formulation.

Other organic solvents that can be used in formuating the composition of the present invention include and are not limited to: tetrahydrofuran (THF), 1,3 Dioxalane, acetonitrile, ethyl acetate, n-propyl acetate, iso-propyl acetate, acetone, methyl ethyl ketone (MEK), cyclohexanone, isophorone, hexane, heptane, toluene, ethylene glycol, alkyl cellosolves and diglycerol dimethyl ether (DGME). Besides lower alcohols, tetrahydrofuran is preferred as an organic solvent.

These high organic solvent/water solutions are more than twice as fast drying than the conventional grades available owing to the higher polymer solids that can be achieved at the same application viscosity whilst allowing a reduction in wet film thickness that contains the higher more volatile organic solvent diluent, resulting in faster drying without compromising other performance properties.

Accordingly, the present invention relates to barrier coatings, particularly having the ability to block the ingress of gases (e.g. oxygen, carbon dioxide, other gases and aromas) and nuisance substances, and which may be used to coat and impart barrier properties to a variety of materials, notably packaging for foods and pharmaceuticals, where exposure to oxygen or nuisance substances must be eliminated or restricted. The coating can be in the form of monoweb or part of a multi-layer laminate structure. A "monoweb" is defined as a coated and/or printed flexible structure comprising only a single substrate film layer.

The coating compositions of the present invention are fast drying, high solids (gas) barrier coatings suitable for application from printing processes, preferably common impression flexographic printing presses, in-line with printing inks to produce printed articles with gas barrier properties for various types of packaging (e.g. food packaging) in a single operation.

Another aspect of the invention is that fillers or extender pigments dispersed in the polymer solution may be used to create a tortuous pathway in the dry film, which further hinders the passage of gases such as oxygen and carbon dioxide and, surprisingly, other substances that have the propensity to migrate through packaging films into the packaged food. Typically, clay minerals with aspect ratios between 20 and 10,000 are preferably used. Particularly preferred are those minerals having an aspect ratio greater than 100. The aspect ratio of an extender or filler or clay mineral particle is the ratio of the major to the minor dimensions (i.e. the length or diameter divided by the thickness). Examples of suitable clays include kaolinite, montmorillonite, atapulgite, illite, bentonite, halloysite, kaolin, mica, diatomaceous earth and fuller's earth, calcined aluminium silicate, hydrated aluminium silicate, magnesium aluminium silicate, sodium silicate and magnesium silicate. Commercial examples of suitable materials are Cloisite $Na^+$ (available from Southern Clay) and Bentone ND (available from Elementis). Of these, the clays, especially the montmorillonite clays are preferred, nanoparticulate clays being most preferred.

The invention relies on the use of poly vinyl alcohol and ethylene vinyl-co-polymers, a polyhydroxy polymer which is the largest volume, synthetic water-soluble resin produced in the world. The excellent adhesion capacity of PVOH to cellulosic materials makes it useful as an adhesive and coating material, highly resistant to solvents, oil, and grease. The chemical resistance and physical properties of PVOH and EVOH resins have resulted in broad industrial use such as textile sizing, adhesives, protective colloids for emulsion polymerization, fibres, production of poly(vinyl butyral), and paper sizing. The predominant use and application of these types of polymers are either via co-extrusion of pellets or from aqueous solution of PVOH and EVOH co-polymers. The PVOH and the EVOH co-polymers have been used extensively in barrier applications for food packaging and in packaging for pharmaceutical and other medicinal products wherein the ingress/egress of oxygen and other gases is reduced.

Amongst other properties, packaging substrates protect food and other contents from external elements (e.g. light, heat, moisture, etc.), and provide gas barrier to prevent early degradation and thereby prolong useful shelf life. However, there are numerous other sources of potential contaminants (nuisance substances) which may find their way through the package and ultimately migrate into the food or other contents causing unacceptable contamination. Such contaminants are increasingly being legislated against, potentially affecting the liability of the brand owners as well as the converters that produce such packaging if they fail to comply.

As the detection limits of analytical tests are becoming increasingly lower, more and more food producers have become aware of trace levels of contaminants which are found in their products. Although, to date this has had little effect on the legislated migration limits in place, some food producers are reconsidering and specifying their own reduced limits.

Owing to the numerous types of potential contaminants, their chemical composition and different physical attributes, it becomes quite difficult to envisage a single barrier coating polymer technology that might prevent their migration.

Converters on the other hand may not wish to stock a large number of different barrier coatings for specific packaging applications and hence there exists the need for a convenient single broad spectrum barrier coating technology.

Polymers used in coatings are usually solid film forming materials unless they polymerize to form a solid, in-situ, by some form of energy cure radiation (e.g. UV, EB radiation) or other instant curing process. In many other cases, the coatings are therefore organic solvent or water based products in which the solvent is evaporated from the coating to leave the solid film behind on the substrate. The need to be soluble in the common solvents acceptable to the packaging industry means that the polymers are very often soluble in the contaminants too. Migration through any packaging film or coating is specific to the chemical structure and morphology of that material. The transmission of molecules across a barrier usually involves several processes. After contacting the barrier surface, the molecule must be adsorbed and subsequently dissolved in the barrier polymer mass. Diffusion of the molecules then takes over and is governed by the kinetic energy of the molecules directly influenced by temperature. Diffusion generally proceeds through a barrier layer from a more to a less concentrated medium. In all cases, permeation is controlled by the solution and diffusion steps. Crystallinity in organic polymer barriers also plays an important role and is a significant morphological property (MW Leonard [Sun Chemical], "Oxygen and Moisture Vapour Barrier Coatings", Encyclopedia of Packaging Technology, 2008).

As already mentioned, Polyvinyl alcohol (PVOH) and ethylene vinyl (EVOH) alcohol co-polymers are well known for their ability to prevent the transmission of oxygen gas and to some extent carbon dioxide and nitrogen and are commonly used in the formulation of gas barrier coatings. Furthermore PVOH/EVOH polymers are surprisingly insoluble in most of the solvents used to prepare coatings for packaging except for water. In this respect, they offer good migration barriers to other chemicals that may be present in the packaging process. As has already been explained, migration barriers must adhere to certain physical property rules and whilst solubility is an important one, it does not guarantee barrier alone. Surprisingly we have found that PVOH/EVOH co-polymers are good barriers to a wide spectrum of other nuisance substances. Examples of such nuisance substances are referenced above and are further delineated herein.

Mineral Oil has been found in many types of food products as a contaminant with potentially harmful effects to human health (Katell Fiselier & Koni Grob. Barriers against the Migration of Mineral Oil from Paperboard Food Packaging. Packaging Technology & Science 2011). While there are several possible sources for this mineral oil, one major source has been confirmed as recycled paper fibers used in the production of recycled carton boards for food packaging. Dry foods are typically packaged in carton based packaging without any functional barrier between the carton and the food. As a result, these foods are contaminated by migrating mineral oils from the carton. The mineral oils are classified as saturated (MOSH) and aromatic (MOAH) and legislation governing the specific migration limits of these contaminants is being formulated in line with toxicology tests in Europe by the Bundesinstitut fur Risikobewertung (BfR—

The Federal Institute for Risk Assessment—(BfR) is a scientific institution within the portfolio of the Federal Ministry of Food and Agriculture (BMEL) in Germany. It advises the Federal Government and Federal Laender on questions of food, chemical and product safety.) Other foods may be packaged in plastic flow wraps or bags that are inserted in recycled carton boxes. Typically these flow wraps are made from polyethylene or polypropylene and heat sealed. Ongoing research has shown that polyethylene is a poor barrier to these mineral oils which migrate via gas phase, and polypropylene is only slightly better. Ambient temperatures in warehouses for dry foods may rise as high as 30° C. at which point high levels of migration have been measured after just seven days.

The use of Ultra-Violet (UV) and Electron Beam (EB) curing inks on food packaging is significant. UV and EB inks dry instantly upon irradiation with, respectively, UV or EB radiation when the low molecular weight liquid components of the ink polymerize and form hard solids. The films formed satisfy most of the physical performance properties required of them, but analytical tests show that incomplete cross linking—for example, from delivering too low a dose of the appropriate radiation—can result in free monomers, photoinitiators, and amine synergists to name just a few of the potentially hazardous and fugitive materials which can migrate from the ink film. Whilst printing inks are not usually intended to come into direct contact with foods or the package contents these materials are still found in foods and the routes for their migration through a packaging substrate or transferred to the food contact surface of the substrate when stored in a reel (known as set off migration) are well known and acknowledged. To combat this problem, ink manufacturers have developed low migration ink products which usually satisfy the specific migration limits (SML) placed upon the materials used to make the inks, but they are significantly more expensive.

Monomeric plasticizers can be used to incorporate flexibility to more brittle polymers used in flexo and gravure solvent-based inks and are known to migrate. Many studies have been done in the past which show that these low-viscosity, non-volatile liquids remain mobile in the printed film and can migrate through certain types of plastic packaging films and transfer through set off migration to food contact surfaces. Surprisingly high levels of phthalate ester plasticizers were found in snack foods during the 1990's which prompted further studies as a result of which the SMLs (Specific Migration Limit) were reduced to such low levels that most phthalate plasticizers and several others were voluntarily removed from ink formulations (C Nerin, J Cacho P Gancedo. "Plasticis", no 4 453-460). However, certain monomeric plasticizers are still used as they are difficult to replace for performance reasons and whilst in general they do not usually exceed their individual SMLs, they can be found in foods as contaminants.

The invention herein describes a method of producing a solution of PVOH and EVOH co-polymers in a blend of water and organic solvent that when coated provides a barrier coating for a variety of applications. There are an increasing number of applications which require a co-solvent such as alcohols, a number of coating applications require the need for volatile solvents such as isopropanol, ethanol and n-propanol to allow certain coatings processes such Gravure and Flexography to run at speeds >100 m/min. Aqueous solutions of polyvinyl alcohol and ethylene vinyl alcohol require slower speeds and high temperatures in coating application to ensure the coatings dry prior to the next coating application. EVOH co-polymers offer greater organic solvent and alcohol tolerance than straight PVOH polymers due to the presence of ethylene on the backbone of poly vinyl alcohol. However, the drawbacks of increasing ethylene content in EVOH co-polymers whilst improving the alcohol tolerance is that gas barrier performance is reduced.

Furthermore, solutions based on co-solvents of water and organic solvents such as alcohol show short term cold (~1-6° C.) storage stability of around 3-6 months. When allowed to stand for long periods at room temperature or at low temperature, the viscosity of these solutions increases progressively with time and the fluidity ultimately disappears resulting in a gel. In order to provide adequate gas barrier properties and block the migration of a wide variety of nuisance substances, it is preferred to have the degree of hydrolysis of PVOH or EVOH at least 70%, more preferably at least 80% or 90% and most preferably at least 95%. There are of course many other substances that have the potential to migrate, such as oligomeric materials remaining as residual by products in the packaging films themselves and by products of adhesives used in the construction of food packaging laminates (e.g. aromatic amines formed when monomeric, aromatic isocyanate components of the adhesives react with moisture from the atmosphere during application and storage of the packaging materials). Bisphenol 'A' is another nuisance substance whose common origin is residual unreacted starting materials in a polymeric component of an ink or coating. It is proposed that these sorts of nuisance substances would also be blocked by the coatings of the present invention.

Increases in viscosity can thus be an indicator for gelation; increases in viscosity are known to be dependent on a number of factors, for example the solvent and temperature at which vinyl acetate is polymerized ultimately impacting on the solution stability over time. The dynamic response of gelation depends more on the crystalizability of PVOH or EVOH and this can be retarded by the presence of irregular structures such as co-monomers and 1,2-glycol linkages and also by tacticity and branching effects, but usually at the expense of barrier properties.

The intent of the present application is to establish a method that allows PVOH and EVOH co-polymers to be dissolved in a co-solvent in which the organic solvent content is 45% or greater. That allows solution storage stability over longer periods, more importantly to be compatible with in-line printing processes or coating applications where the need to run at speeds and where drying temperatures are limited by the coating/printing process. A further extension of this patent allows for the use of fillers to further improve the barrier properties of the coating while keeping the overall alcohol content at 45% or greater.

The invention and examples demonstrate barrier properties with and without filler can be achieved where a PVOH or EVOH co-polymer preferably with an ethylene content of <25 mol %, more preferably <20 mol %, and most preferably <15 mol % in which the viscosity as measured by a Brookfield synchronized motor rotary type viscometer of a 4% aqueous solution at 20° C. is preferably < than 4.0 mPas, more preferably < than 3.0 mPas, and most preferably <2.5 mPas. The invention relies on the PVOH or EVOH having a molecular weight distribution of preferably <16000 Da, more preferably <12000 Da, and most preferably < than 7000 Da (Daltons). The number-average molecular weight (Mn), the weight average molecular weight (Mw) and its distribution (Mw/Mn) are measured by gel permeation chromatography (GPC) in an appropriate eluent. The PVOH and EVOH co-polymer is dissolved in a co-solvent of water and an alcohol, in which the alcohol content is 45% or more and provides a stable solution at room temperature. The PVOH and EVOH co-polymer with a high alcohol content of 45% or more can be further improved with filler to impart a tortuous pathway to the transmission of nuisance gases (such as oxygen or a gas with an inappropriate aroma) and other nuisance substances. There are no published examples of barrier coatings based on PVOH and EVOH with an alcohol content of 45% or more which are storage-stable for more than 14 days.

It is preferred that the barrier coating composition of the present invention has solids content greater than 7.5%, more preferably greater than 8% and most preferably greater than 9% by weight and a coating viscosity of less than 30 seconds (Zahn cup #2 flow time) at 23° C.

It is a preferred aspect of this invention that the barrier coatings of this invention have the following property, namely that the co-polymers adhere to the following rule: wfm÷% NVC×☐≤12, wherein wfm is the wet film weight in grams per m$^2$; % NVC is the percent dry polymer content of the aqueous coating containing more than 45% lower alcohol, and ☐ is the viscosity of the coating expressed in seconds #2 Zahn cup at 23° C.

The present invention has been described in detail, including the preferred embodiments thereof. However, it will be appreciated that those skilled in the art, upon consideration of the present disclosure, may make modifications and/or improvements on this invention that fall within the scope and spirit of the invention.

EXAMPLES

Test Methods
% Non Volatile Content (% NVC)

The test involves weighing approximately 1 g of a coating into a petri dish, the actual weight being recorded to two decimal places. This is then placed in an electrically heated fan assisted oven for 30 minutes at 150° C. The sample is then cooled to room temperature and re-weighed. The % NVC is calculated as follows:

% NVC=final weight of dry coating(grams)÷Initial weight of wet coating(grams)×100

Storage Stability

An initial viscosity of coating solution is measured using (Seta) Zahn cup #2 at 23° C. 100 g of the coating solution is placed in a tightly sealed glass jar in a refrigerator set at 4° C. The sample is taken out periodically (every 4 days) and its viscosity measured. Changes in viscosity or appearance and homogeneity are considered negative factors. Increases in viscosity of >20 secs Zahn #2 cup above initial measurement, which is set as application viscosity, is considered a fail for storage stability, as is visible phase separation (phase separation is seen as two or more distinct layers formed in the solution, indicating poor compatibility or incomplete solubility of the components in the solvent blends).

Oxygen Transmission Rate (OTR)

The oxygen transmission rates (OTR) of the coatings when applied to a polyester film were determined on a Mocon Oxtran 2/21 gas permeability tester at 23° C. and 0/65% relative humidity. This condition represents the normal test protocol for dry food packaging, wherein the permeant gas (02) is adjusted to 65% RH (23° C.) and the carrier gas (100% $N_2$) to 0% RH (23° C.).

The substrate used was freshly corona discharge treated 12 micron Mylar 800 or Melinex® S (Dupont). The coatings were applied with a No. 0 K-Bar (ex. RK Print; delivering about 4 microns wet film thickness) and were dried in a warm flow of air (lab prints were dried with a hair dryer).

Migration Test Method

In the following examples, potential barrier coating formulations were applied to 40 micron corona discharge treated film and tested for barrier properties against a number of ink-related chemicals that could potentially migrate through the film (e.g. polyethylene (PE) or polypropylene (PP)) and possibly the coating, in a migration cell (see FIG. 1). The test was designed in such a way to replicate the common situation in which food is packed in unprinted polyethylene (or polypropylene) sealed bags (flow wraps) and inserted into a carton. The cartons usually form the printed rigid package. The test is also relevant for another common situation where the plastic film is printed on the external surface of the food package.

Tests were carried out for a series of monomeric plasticisers, acrylate monomers, photo initiators, co-synergists and mineral oil hydrocarbons, both MOSH and MOAH. These ink-related compounds were chosen for their molecular size, chemical diversity and propensity to migrate. Specific analytical methodologies are described in the examples.

Drying Speed (Lab Test)

The coating solution is applied using a No 0 K bar (Manufactured by RK Print Coat UK Ltd) to 12 micron Melinex S that is freshly corona treated. A No 0 K bar is used to apply the coating at approximately 4 grams per square meter wet film weight. Immediately after drawing down the coating film, a stopwatch is started and the surface of the coating is examined at 5 second intervals by touching until the coating feels dry and there is no transfer of wet coating to the fingertip or apparent stickiness, whereupon the time taken to reach this condition is recorded.

Drying Speed (Press Test)

Coating examples were evaluated on a Windmoller & Holscher (6 color common impression) Soloflex flexographic press. The coating under evaluation was pumped to print unit one and a typical packaging ink in the last print unit, No 6. The drying air temperature of the press was set at 60° C. and freshly corona treated Melinex® S fed from the feed reel through the press to the delivery reel. The speed of the press is gradually increased until such point that the packaging ink in unit No 6 no longer transfers satisfactorily to the coating applied from unit No 1. At this point, the test is stopped and the speed reached just before the poor transference occurred is recorded. When the maximum speed of the press is reached without problems, the packaging ink is taken out of unit No 6 and placed in unit No 5 and the trial continued in this fashion until the speed at which failure to transfer properly is reached. The higher the speed (measured in m/min) and the lower the print unit number, indicates the faster drying examples.

Lamination Bond Strength

Laminates were prepared by applying the coating to the treated side of polyester film, an adhesive was applied over the top of the dried coating then laminated to the treated side of a 30 μm gauge poly(ethene). The adhesive used was supplied by COIM NC250/CA350, and was prepared according to the manufacturer's instructions and applied so as to achieve a final dry film weight of 2.5 gsm. The laminates were then stored for 10 days at 25° C. to ensure full cure of the isocyanate-based adhesive. Bond strengths were measured on a JJ Lloyd LRX tensiometer using a cross head speed of 30 mm/min under 'T' peel separation conditions. Laminate samples were 15 mm wide and results are given in grams force per 15 mm.

The following examples illustrate specific aspects of the present invention and are not intended to limit the scope thereof in any respect and should not be so construed.

Example 1

Aquaseal® X2281 is a polyvinyl alcohol solution in water supplied by Paramelt B.V. Netherlands. The polymer solution is supplied at around 20-22% non-volatile content. Aquaseal® X2281 was further diluted in the laboratory with a mixture of Industrial. Methylated Spirits (IMS* also sold as TSDA) and water under mild agitation on a vortex stirrer (see Table 1).

TABLE 1

Composition of Example 1.

| | Example 1 |
|---|---|
| Aquaseal X2281 | 43.5 |
| IMS* | 50.8 |
| De-Ionised Water | 5.7 |
| Total | 100.0 |

IMS* = Ethanol denatured with 2.2% ethyl acetate and 0.1% 2-propanol

The following results were achieved as shown in Table 2.

TABLE 2

Properties of Example 1.

| | Example 1 |
|---|---|
| Viscosity (#2 Zhan @ 23° C.) seconds | 23 |
| % NVC | 9.3 |
| OTR 0/65% RH, 4 gsm wet (0.36-0.4 gsm dry) | 1.2 cc/m2/day |
| Drying speed (Lab) +/− 10 seconds | 50 seconds ± 5 seconds |
| Storage Stability | >14 days |

Examples 2A, 2B and 2C

Mowiol® 2-97 is a polyvinyl alcohol resin supplied by Kuraray Specialties Europe. It has a molecular weight in the region of 5000 Daltons. The viscosity, specified by Kuraray is 2.2-2.3 mPa·s as a 4% aqueous solution at 20° C. This polymer was made into the following solutions (see Table 3) using solutioning techniques outlined by the manufacturer and diluted with lower alcohols including ethanol (IMS*), 2-propanol and 1-propanol.

TABLE 3

Composition of Examples 2A, 2B and 2C.

| | Example 2A | Example 2B | Example 2C |
|---|---|---|---|
| Mowiol 2-97 (20% Aq) | 50.0 | 50.0 | 50.0 |
| IMS* | 45.0 | — | — |
| 1-Propanol | — | 45.0 | — |
| 2-Propanol | — | — | 45.0 |
| De-ionised water | 5.0 | 5.0 | 5.0 |
| Total | 100.0 | 100.0 | 100.0 |

The following results were achieved as indicated in Table 4.

TABLE 4

Properties of Examples 2A and 2C.

| | Example 2A | Example 2C |
|---|---|---|
| Viscosity (#2 Zhan @ 23° C.) seconds | 20 | 21 |
| % NVC | 10.1 | 10 |
| OTR 0/65% RH, 4 gsm wet (0.36-0.4 gsm dry) | 1.2 cc/m2/day | 1.4 cc/m2/day |
| Drying speed (Lab) +/− 10 seconds | 45 | 51 |

Example 3

Poval® 102 is a low molecular weight polyvinyl alcohol resin supplied by Kuraray Europe. It is highly hydrolysed at 98-99% with a molecular weight below 10,000 Daltons with a viscosity at 2.7-2.8 mPa·s measured as a 4% aqueous solution at 20° C. The polymer was first dissolved in deionised water and subsequently let down as follows (see Table 5).

TABLE 5

Composition of Example 3.

| | Example 3 |
|---|---|
| Poval 102 (20% Aq) | 30.0 |
| IMS* | 47.0 |
| De ionised water | 23.0 |
| Total | 100.0 |

The following results were achieved as indicated in Table 6:

TABLE 6

Properties of Example 3.

| | Example 3 |
|---|---|
| Viscosity (#2 Zhan @ 23° C.) seconds | 15 |
| % NVC | 6.0 |
| OTR 0/65% RH, 4 gsm wet (0.36-0.4 gsm dry) | 2.2 cc/m2/day |
| Drying speed (Lab) +/−10 seconds | 50 seconds ± 10 seconds |
| Storage Stability | >14 days |

Comparative Example 4

A commercially available oxygen barrier coating, SunBar® Gen 1.0 (available from Sun Chemical Limited), was used for comparative purposes. This coating is normally supplied in 2 parts (A &B). Part A consists of a solution of polyvinyl alcohol and ethylene vinyl alcohol co-polymers dissolved in water and 1-propanol (see Table 10). Part B is an aqueous dispersion of exfoliated montmorillonite clay, which is intended to be blended with the Part A just before application. In this experiment, only the part A was used. Owing to the higher viscosity grade polymer Mowiol® 4-98 in SunBar® Gen 1.0, the solution does not tolerate high levels of lower alcohols and is optimized at 20% for useful storage stability and polymer solids content.

TABLE 7

Composition of Comparative Example 4.

| Comparative Example 4 | |
|---|---|
| Exceval AQ4014 | 6.8 |
| Mowiol 4-98 | 1.2 |
| N-propanol | 20.0 |
| De ionised water | 72.0 |
| Total | 100.0 |

The following results were achieved as indicated in Table 8:

TABLE 8

Properties of Comparative Example 4.

| | Comparative Example 4 |
|---|---|
| Viscosity (#2 Zhan @ 23° C.) seconds | 20 |
| % NVC | 8.0 |
| OTR 0/65% RH, 4 gsm wet (0.36-0.4 gsm dry) | 1.7 cc/m2/day |
| Drying speed (Lab) +/−10 seconds | >60 seconds |
| Storage Stability | >14 days |

Comparative Example 5

SunBar® Gen 1.1 is a commercially available two-part oxygen barrier coating available from Sun Chemical Limited. The Part A of this coating is based on the same ethylene vinyl alcohol co-polymer as used in Comparative Example 4, but additionally includes a solution of Sokalan® CP 13 S (a maleic anhydride co-polymer solution supplied by BASF) (see Table 9). The level of lower alcohol tolerated by this formulation is higher and was evaluated here for comparative purposes without the Part B (clay dispersion).

TABLE 9

Composition of Comparative Example 5.

| Comparative Example 5 | |
|---|---|
| Exceval AQ4014 | 8.1 |
| Sokalan CP13 S | 8.8 |
| N-propanol | 30.0 |
| De ionised water | 53.1 |
| Total | 100.0 |

The following results were achieved as indicated in Table 10.

TABLE 10

Properties of Comparative Example 5.

| | Comparative Example 5 |
|---|---|
| Viscosity (#2 Zhan @ 23° C.) seconds | 22 |
| % NVC | 10.3 |
| OTR 0/65% RH, 4 gsm wet (0.36-0.4 gsm dry) | 2.5 cc/m2/day |
| Drying speed (Lab) +/−10 seconds | >60 seconds |
| Storage Stability | >14 days |

Example 6A and Comparative Example 6B

The solutions of Example 1 and Comparative Example 4 were further modified by the addition of exfoliated bentonite clay. The clay is supplied by Southern Clays Inc as Cloisite® $Na^+$. Formulations of the coatings are provided below as Example 6A and Comparative Example 6B respectively (see Table 11). Care was taken to ensure that the correct amount of alcohol was present so as not to cause solution or clay dispersion instability in each case. These two clay composite formulations were compared alongside the unmodified solutions of Example 1 and Comparative Example 4 on a Windmoeller and Holscher 6 colour Soloflex common impression flexographic press. Comparative Example 6B represents the commercially available product, SunBar Gen 1.0 (parts A&B combined).

TABLE 11

Compositions of Example 6A and Comparative Example 6B.

| Example 6A | | Example 6B (Comparative) | |
|---|---|---|---|
| Aquaseal X 2281 | 21.5 | Exceval AQ4014 | 3.4 |
| IMS | 49.4 | Mowiol 4-98 | 0.6 |
| Deionised Water | 27.1 | Deionised Water | 69.5 |
| Cloisite Na+ | 2.0 | Cloisite Na+ | 1.5 |
| | | 1-propanol | 10.0 |
| | | 2-propanol | 15.0 |
| Total | 100.0 | | 100.0 |

The Press Conditions were as follows: Drying Temperature 60° C. (inter unit driers); Print Room temperature 20° C. (@ 65% RH); Coating Anilox 225#line/cm screen/11.4 cc/m2 applying 2.5-3.0 gsm wet; and Substrate Melinex S (12 micron PET freshly corona treated).

The coated substrates were then laminated. All results are shown below in Table 12:

TABLE 12

Properties of Example 1, Comparative Example 4, Example 6A and Comparative Example 6B.

| Property | Example 1 | Example 4 (Comparative) | Example 6A | Example 6B (Comparative) |
|---|---|---|---|---|
| Viscosity #2 Zahn (23° C.) seconds | 23 | 20 | 29 | 21 |
| % NVC | 9.3 | 8.0 | 6.5 | 5.5 |
| Storage Stability | >14 days | >14 days | N/A* | N/A* |
| Drying speed (m/min) | 75 | 40 | 55 | 30 |
| OTR (23 C. 0/65% RH) cc/m2/day | 1.1 | 2.1 | 1.5 | 2.0 |
| Lamination Bond strength (g/15 mm) | >300 | 265 | 230 | 225 |

*Coatings mixed with clay have a relatively short period of use and are normally supplied as 2-part formulations being mixed together no more than 12 hours before application to thesubstrate.

These results show that higher % NVC at application viscosity coupled with high (>45%) levels of alcohol diluent provide significantly faster drying. Example 1 is 2.5× faster than the commercial coating, comparative example 6B.

Examples 7A, 7B, 7C & 7D

Four coatings based on poly vinyl alcohol and ethylene vinyl alcohol co polymers (supplied by Kuraray Specialties Europe) were made for testing, as described in Table 13. The grades of polymer chosen were selected for having adequate solids at low application viscosities (50-100 mPas seconds) suitable for the application of the highest possible wet film weights and importantly a high level of hydrolysis in the region of 97-99% which results in high levels of hydrogen bonding and to some extent crystallinity, known to increase the barrier properties.

TABLE 13

Compositions of Examples 7A, 7B, 7C and 7D.

| Components | Coating "7A" | Coating "7B" | Coating "7C" | Coating "7D" |
|---|---|---|---|---|
| Mowiol 4-98 | 8 | | | |
| Exceval AQ4104 | | 10 | | |
| Poval 102 | | | 10 | |
| Mowiol 2-97 | | | | 10 |
| De-Ionised water | 67 | 45 | 45 | 45 |
| 1-Propanol | 25 | 45 | 45 | 45 |
| Total | 100 | 100 | 100 | 100 |

Each coating was applied onto the corona discharge treated surface of 40 micron polypropylene using a K1 applicator Bar (supplied by RK Print UK which applies 6 grams per square meter wet coating) and dried for a few seconds with a hair drier. Each coated film sample was assigned the coating letter corresponding to the coating used.

Figure 1:
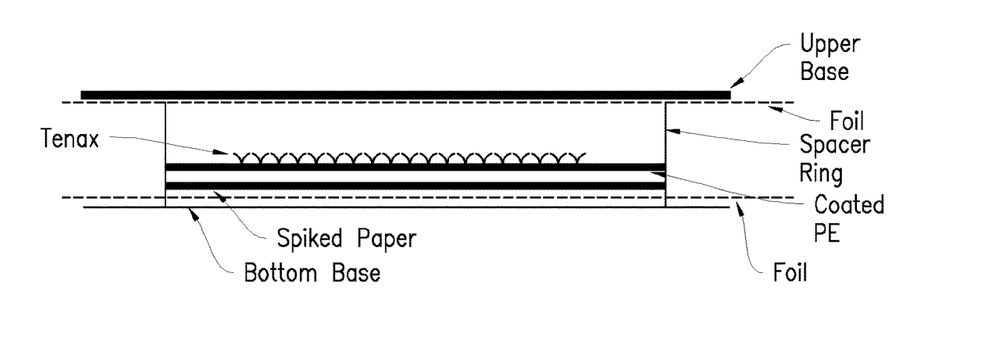
FIG. 1 shows a migration cell used for testing migration of coating formulations.

An initial screening experiment was done by doping ~5 ug of Benzophenone, EPD, DIPN, DPGDA, Dodecane and Eicosane onto filter paper in a migration cell as shown in FIG. 1. The impregnated filter paper was placed in contact with the non-coated side of the polypropylene which in turn was mounted onto a migration cell loaded with 1 g of a food simulant, Tenax and placed in an incubator at 40° C. for 3 days (see FIG. 1)

The Tenax was subsequently removed and extracted with ethyl acetate, the solvent was concentrated in an automatic evaporator and an internal standard was added.

The extracts were then analysed quantitatively using GC-MS. Results are given in Table 14 below. Results are given in micrograms and percentage of the total amount of potential migrant used

TABLE 14*

Testing Results of Examples 7A, 7B, 7C and 7D.

| | Dodecane | | Eicosane | | DIPN | | DPGDA | | Benzophenone | | EPD | |
|---|---|---|---|---|---|---|---|---|---|---|---|---|
| | µg | % | µg | % | µg | % | µg | % | µg | % | µg | % |
| No Substrate | 1.8 | | 2.1 | | 3.1 | | 2 | | 2 | | 1.4 | |
| Coex PP | 1 | 55 | 9.1 | 436 | 2.1 | 67 | 0.5 | 23 | 1.9 | 95 | 1 | 69 |
| Vodex Film | 0.1 | 5 | 0.3 | 16 | 0.2 | 6 | 0.1 | 4 | 0.7 | 33 | 0.5 | 38 |
| Coating 7A | 0.2 | 10 | 5 | 241 | 0.2 | 6 | 0 | 0 | 0.1 | 4 | 0.1 | 5 |
| Coating 7B | 0.2 | 10 | 2 | 96 | 0.3 | 9 | 0 | 0 | 0.15 | 6 | 0.2 | 10 |
| Coating 7C | 0.4 | 24 | 4.1 | 198 | 0.1 | 4 | 0 | 0 | 0.1 | 4 | 0 | 1 |
| Coating 7D | 0.2 | 10 | 2.5 | 120 | 0.2 | 6 | 0 | 0 | 0.2 | 8 | 0 | 0 |

*DIPN (Di isopropyl naphthalene-MOAH simulant)
DPGDA (Di propylene glycol di acrylate- UV/EB packaging ink component)
Dodecane (MOSH simulant)
Benzophenone (photo initiator used in UV curing packaging inks)
Eicosane (used as analytical internal standard)
EPD (amine synergist used in UV curing packaging inks)

NB Vodex® Film (supplied by Amcor) is a barrier film recommended for food packaging flow wraps to prevent the migration of substances likely to migrate from inks and external packaging. It is believed to be based on a coextrusion of polypropylene and ethylene vinyl alcohol and was included as an external control/comparison.

The results indicate that vinyl alcohol and ethylene vinyl alcohol co polymers with high levels of hydrolysis are good barriers to migration of chemically diverse range of materials such as those found in Energy cured printing inks and recycled carton boards.

Example 8

The following barrier coating, based on a low molecular weight PVOH of the present invention and exfoliated sodium Bentonite clay (Cloisite® Na+ ex Rockwood, Altana-BYK) was prepared for migration tests. The polymer was first dissolved in a portion of the deionised water at 90° C. before adding the IMS and 1-propanol. A dispersion of the Cloisite® Na+ was prepared by stirring it into the remaining water and 2-propanol before mixing with the polymer solution.

Bentonite clay (Cloisite® Na+ ex Southern Clays Inc) was included in this formulation to see what effect an exfoliated silicate would have on the migrating species. Such clays when exfoliated orientate in the coating to form rows of platelet particulates which are known to create a tortuous path to the passage of gases. It was reasoned that this might also be true for the migrating species under test. The formulation is as described in Table 15.

TABLE 15

Compositions of Example 8.

| Example 8 (% w/w) | |
|---|---|
| Mowiol 2-97 | 10.0 |
| IMS | 25.0 |
| Deionised Water | 38.5 |
| Cloisite Na+ | 1.5 |
| 1-propanol | 10.0 |
| 2-propanol | 15.0 |
| | 100.0 |

The coating was applied to freshly corona treated polyethylene film using three different applicator bars (K Bars ex RK Print UK) intended to apply three different film weights at 4, 6 and 12 grams per m² (also termed "gsm") wet. The coated film was dried using a hair dryer for several seconds. This was then inserted into a migration cell as shown above in FIG. 1 with the doped filter paper and Tenax food simulant as previously described. Control experiments were also completed using uncoated polyethylene to show the effect of the barrier coating. In this example, the filter paper was doped with a cocktail of common monomeric plasticisers used in flexo and gravure packaging inks. The cell, sealed in foil, was placed in an oven at 40° C. for three days before analysis of the food simulant was carried out as detailed above.

Filter papers were 'spiked' by the application of 250, 500 and 1000 μl of an ethyl acetate solution containing 1000 μg·ml$^{-1}$ each of the individual compounds under test and the ethyl acetate allowed to evaporate. The highest level of 1 mg (1000 μl of 1000 μg·ml$^{-1}$) was chosen to reflect a possible real-World scenario in which a compound, present at a 10% level in a 2 gsm ink, could give rise to a maximum migration of 200 mg·m$^{-2}$ from the print. This equates to 1 mg from the 50 cm² of print (doped paper) defined by the migration cell.

The following results were obtained and presented in Table 16. The results are based upon the average of two tests.

TABLE 16

Migration Test Results of Example 8 Using Common Monomeric Plasticizers (results in micrograms).
Migration Tests Using Common Monomeric Plasticizers (results in micrograms)

| | Uncoated Polyethylene (control) | | | Example 8 coated PE @ 4 gsm | | | Example 8 coated PE @ 6 gsm | | | Example 8 coated PE @ 12 gsm | | |
|---|---|---|---|---|---|---|---|---|---|---|---|---|
| Filter paper doping level (μl) | 250 | 500 | 1000 | 250 | 500 | 1000 | 250 | 500 | 1000 | 250 | 500 | 1000 |
| Sample No | 147 | 148 | 149 | 150 | 151 | 152 | 153 | 154 | 155 | 156 | 157 | 158 |
| Ethyl citrate | 26.4 | 77 | 136.4 | 15.4 | 16 | 67.8 | 2.2 | 6.8 | 32.4 | 0 | 1 | 1.6 |
| N-ethyl Toluene Sulphonamide | 54.6 | 114.4 | 137.6 | 29.2 | 30 | 77 | 0 | 7 | 37.2 | 0 | 0 | 0 |
| o/p toluene sulphonamide | 5 | 7.2 | 11.2 | 0 | 0 | 0 | 0 | 0 | 0 | 0 | 0 | 0 |
| Di butyl sebacate | 139 | 277.2 | 100.8 | 109.2 | 143.4 | 81.6 | 9.4 | 18 | 62.6 | 6.4 | 7.4 | 7.4 |
| Acetyl tri butyl citrate | 55 | 115.4 | 24.4 | 28.4 | 28.6 | 16.6 | 3.8 | 5 | 11.6 | 0 | 3.6 | 3.6 |
| iso decyl diphenyl phosphate | 26 | 57.4 | 9.6 | 20.4 | 18.8 | 8.2 | 1.4 | 2.2 | 6.6 | 0 | 0 | 0 |
| Di octyl adipate | 16.6 | 32.4 | 9.6 | 16 | 15.6 | 9.2 | 6.8 | 7.4 | 10 | 0 | 0 | 0 |

Increasing film weight of coating can be seen to diminish the migration of the plasticisers through the coated polyethylene—results are given in micrograms (10$^{-6}$ g). Even at the highest exposure levels the migration is reduced well below acceptable limits in particular the Specific Migration Limits (SMLs) for each migrant.

Example 9

The same coating used in Example 8 was again applied to corona discharge treated polyethylene film in exactly the same way. However in the following series of tests the filter paper was doped with a cocktail of typical components used to prepare commercial energy curable flexo and offset printing inks used for food packaging. All other test conditions were identical to those described in Example 8. Results are as listed in Table 17.

TABLE 17

Migration Test Results of Example 9 Using Common Energy Curing Ink Components (Results in micrograms).
Migration Tests Using Common Energy Curing Ink Components (Results in micrograms)

| | uncoated Polyethylene (control) | | | Example 8 coated PE 4 gsm | | | Example 8 coated PE 6 gsm | | | Example 8 coated PE 12 gsm | | |
|---|---|---|---|---|---|---|---|---|---|---|---|---|
| Filter paper doping level (μl) | 250 | 500 | 1000 | 250 | 500 | 1000 | 250 | 500 | 1000 | 250 | 500 | 1000 |
| Sample No | 147 | 148 | 149 | 150 | 151 | 152 | 153 | 154 | 155 | 156 | 157 | 158 |
| Sartomer SR308 | 174.8 | 408.4 | 793.8 | 135.2 | 192.4 | 587.2 | 51.6 | 97.4 | 353.2 | 8.6 | 15.6 | 22 |
| sartomer SR306 | 116 | 267 | 326.2 | 72.8 | 90.2 | 203.2 | 17.6 | 31.2 | 111.6 | 7.2 | 8.6 | 9.2 |
| sartomer SR351 | 115.4 | 218.4 | 190.6 | 50.8 | 59.4 | 94.6 | 9.8 | 15.8 | 55.2 | 4 | 4.4 | 4.6 |

TABLE 17-continued

Migration Test Results of Example 9 Using Common Energy Curing Ink Components (Results in micrograms).
Migration Tests Using Common Energy Curing Ink Components (Results in micrograms)

|  | uncoated Polyethylene (control) | | | Example 8 coated PE 4 gsm | | | Example 8 coated PE 6 gsm | | | Example 8 coated PE 12 gsm | | |
| --- | --- | --- | --- | --- | --- | --- | --- | --- | --- | --- | --- | --- |
| Filter paper doping level (µl) | 250 | 500 | 1000 | 250 | 500 | 1000 | 250 | 500 | 1000 | 250 | 500 | 1000 |
| Sartomer SR 454 | 0 | 0 | 0 | 0 | 0 | 0 | 0 | 0 | 0 | 0 | 0 | 0 |
| Sartomer SR9020 | 0 | 0 | 0 | 0 | 0 | 0 | 0 | 0 | 0 | 0 | 0 | 0 |
| Sartomer SR 355 | 0 | 0 | 0 | 0 | 0 | 0 | 0 | 0 | 0 | 0 | 0 | 0 |
| Omnirod OMBB | 107.6 | 210.4 | 162.4 | 62.2 | 69.8 | 105.6 | 10.2 | 16.2 | 61 | 0.8 | 1.6 | 1.8 |
| Omnirad EHA | 81.2 | 147.4 | 40.6 | 48.4 | 55.6 | 26.6 | 2.2 | 4.8 | 17.8 | 1.4 | 1.6 | 1.6 |
| Omnirod 4-PBZ | 20.2 | 51.4 | 10.2 | 17.2 | 16 | 8 | 0 | 0 | 6 | 0 | 0 | 0 |
| Irgacure 369 | 0 | 0 | 0 | 0 | 0 | 0 | 0 | 0 | 0 | 0 | 0 | 0 |

The Chemical names of Energy cure components are listed below in Table 18.

TABLE 18

Chemical Names of Energy Cure Components.

| | |
| --- | --- |
| Sartomer SR308 | Di propylene glycol di acrylate |
| sartomer SR306 | Tri propylene glycol di acrylate |
| sartomer SR351 | Tri methylol propane tri acrylate |
| Sartomer SR 454 | Tri methylol propane ethoxy tri acrylate |
| Sartomer SR9020 | Glycerol propoxy tri acrylate |
| Sartomer SR 355 | di tri methylol propane tri acrylate |
| Omnirod OMBB | Methyl Benzoyl Benzoate |
| Omnirad EHA | Ethylhexyl diamino benzoate |
| Omnirod 4-PBZ | 4, Phenyl benzo phenone |
| Irgacure 369 | 2-Benzil-2-dimethylamino-4-morpholino-butyrophenone |

The results indicated again that increasing film weight of the barrier coating diminishes the migration of components that are seen to otherwise penetrate and migrate through the uncoated polyethylene (except in the cases where no migration through the PE control is seen).

Example 10

Recycled carton board, used in food packaging, was used as a source of mineral oil hydrocarbons, both aliphatic (MOSH) and aromatic (MOAH). In a separate analysis, the total mineral oil extract from the carton board was determined to be 2000 ppm. Coatings were applied onto the corona discharge treated surface of 15 micron polypropylene using three different K0, K1 and K2 applicator Bars (supplied by RK Print UK, which apply 4, 6, and 12 grams per square meter wet coating respectively) and dried with a hair drier. The recycled board samples (50 cm$^2$) were placed in contact with the non-coated side of the polypropylene film samples. In turn these were mounted onto a migration cell (see FIG. 1) loaded with 1 g of a food simulant, Tenax and placed in an incubator at 60° C. for 10 days. Following the storage at elevated temperatures the exposed Tenax (1 g from each cell) was subsequently removed and extracted with ethyl acetate. The extracts were then analysed quantitatively using GC-MS. Results are given in Table 19 below. Results are given in mg of total mineral oil migrated from 50 cm$^2$ of carton and also this value converted to the EU packaging model. The EU packaging model is based on the average food package design, which utilizes 6 dm$^2$ (600 cm$^2$) of packaging material to pack 1 kg of food. At the time of experimentation, proposed legislation (BfR) on the maximum levels of mineral oils allowed in foods in Europe was 0.6 ppm (MOSH) and 0.15 ppm (MOAH). The numbers in the EU packaging model column are the totals for MOSH and MOAH. Clearly any levels above 0.75 ppm would be outside the proposed recommendation.

TABLE 19

Migration Results of Example 8 on film.

| Example 8 Coating | EU Packaging Model (ppm) | (mg/50 cm$^2$) |
| --- | --- | --- |
| Example 8 (4 gsm wet) on film | 0.647 | 7.764 |
| Example 8 (6 gsm wet) on film | 0.2235 | 2.682 |
| Example 8 (12 gsm wet) on film | 0.1 | 1.2 |

These results indicate that even the lowest film weight passes the threshold level of the proposed legislation for total mineral oil migration. The analytical methods for separating MOSH and MOAH extract are not precise. Generally, it is accepted that the ratio of MOSH:MOAH extracts is ~80:20 from most recycled carton boards. Since the maximum level of MOAH permitted is 0.15, the result at 6 gsm wet provides adequate barrier.

Comparative Examples 11A, 11B, 11C & 11D

The following four coatings were prepared on polyvinyl alcohol resins with low hydrolysis levels, to demonstrate the inferior barrier properties that these polymers generally show, compared to the compositions of this invention. Poval® PVOH resins are supplied by Kuraray Specialties Europe. The formulations are listed in Table 20, and the oxygen transmission results in Table 21.

TABLE 20

Formulations of Examples 11A, 11B, 11C and 11D.

| Components | Coating 11A | Coating 11B | Coating 11C | Coating 11D |
| --- | --- | --- | --- | --- |
| Poval LM25 | 10 | | | |
| Poval LM20 | | 10 | | |
| Poval LM22 | | | 10 | |
| Poval L 8 | | | | 10 |
| De-Ionised water | 45 | 45 | 45 | 45 |
| 1-Propanol | 45 | 45 | 45 | 45 |
| Total | 100 | 100 | 100 | 100 |

TABLE 21

Oxygen Transmission Results of Examples 11A, 11B, 11C and 11D.

| Coating | Mol % Hydrolysis of polymer | Oxygen Transmission 23 C. 0/65% RH (cc/m2/day) |
|---|---|---|
| Example 11A | 33-38 | 100 |
| Example 11B | 38-42 | 98 |
| Example 11C | 47-53 | 89 |
| Example 11D | 38-42 | 95 |
| uncoated PET | | 110 |

None of the lower hydrolysis grades of PVOH provide any significant improvements over the uncoated substrate in these comparative examples. No further migration tests were deemed necessary.

Examples 12A and 12B

Example 3 is repeated, but with substituting different solvent blends for the IMS component in Example 3, to produce examples 12A and 12B, as shown in Table 22:

TABLE 22

Composition of Example 3, 12A and 12B.

| | Example | | |
|---|---|---|---|
| | 3 | 3B | 3C |
| Poval 102 (20% Aq) | 30.0 | 30.0 | 30.0 |
| IMS* | 47.0 | | 46.0 |
| THF | | 47.0 | |
| MEK | | | 1.0 |
| De ionised water | 23.0 | 23.0 | 23.0 |
| Total | 100.0 | 100.0 | 100.0 |

Examples 12 A and 12B will show similar non-volatile contents and oxygen transmission rates as for Example 3. Formulations 12A and 12B will likewise be storage-stable for at least two weeks.

All references cited herein are herein incorporated by reference in their entirety for all purposes.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the invention.

We claim:

1. A barrier coating composition comprising a poly vinyl alcohol and/or ethylene vinyl alcohol co-polymer dissolved in an aqueous mixture that comprises at least 45% of one or more organic solvent, based on the total weight of the barrier coating composition; wherein the poly vinyl alcohol or ethylene vinyl alcohol co-polymer has a molecular weight distribution of less than 16,000 Daltons; wherein the barrier coating composition has a solids content of 7.5% to 55% by weight and a coating viscosity of less than 30 seconds using Zahn cup #2 flow time at 23° C.; and wherein when the barrier coating composition is coated as a wet film follows a rule of:

$$wfm \div \% \ NVC \times \eta \leq 12,$$

wherein wfm is the wet film weight in grams per m$^2$;
% NVC is the percent by weight of dry polymer content of the barrier coating composition, and
$\eta$ is the viscosity of the coating expressed in seconds using Zahn cup #2 flow time at 23° C.

2. The barrier coating composition of claim 1, wherein the organic solvent is a lower alcohol.

3. The barrier coating composition of claim 2, wherein the lower alcohol is selected from the group consisting of: ethanol, Industrial methylated Spirits and blends thereof.

4. The barrier coating composition of claim 1, wherein the organic solvent is selected from the group consisting of: tetrahydrofuran, 1,3 Dioxalane, acetonitrile, ethyl acetate, n-propyl acetate, iso-propyl acetate, acetone, methyl ethyl ketone (MEK), cyclohexanone, isophorone, hexane, heptane, toluene, ethylene glycol, alkyl cellosolves and diglycerol dimethyl ether (DGME).

5. The barrier coating composition of claim 4, wherein the organic solvent is tetrahydrofuran.

6. The barrier coating composition of claim 1 further comprising a filler and/or extender pigment.

7. The barrier coating composition of claim 6, wherein said filler or extender pigment has an aspect ratio greater than 20.

8. The barrier coating composition of claim 1 that acts as a barrier against gas and/or nuisance substances.

9. The barrier coating composition of claim 1, wherein said poly vinyl alcohol or ethylene vinyl alcohol co-polymer has a viscosity of lower than 4 mPa·s at 4% solids.

10. The barrier coating composition of claim 1, wherein said poly vinyl alcohol or ethylene vinyl alcohol co-polymer has a viscosity of lower than 3 mPa·s at 4% solids.

11. The barrier coating composition of claim 1, wherein said poly vinyl alcohol or ethylene vinyl alcohol co-polymer has a degree of hydrolysis of at least 95%.

12. The barrier coating composition of claim 1 being stable for more than 14 days.

13. The barrier coating composition of claim 12 having solids content greater than 8% by weight and a coating viscosity of less than 30 seconds using Zahn cup #2 flow time at 23° C.

14. The barrier coating composition of claim 12 having solids content greater than 9% by weight and a coating viscosity of less than 30 seconds using Zahn cup #2 flow time at 23° C.

15. The barrier coating composition of claim 1 having a viscosity suited for flexographic and gravure printing presses.

16. A method of making a coating that forms a barrier against gases and/or nuisance substances, comprising dissolving a poly vinyl alcohol and/or ethylene vinyl alcohol co-polymer in an aqueous mixture that comprises at least 45% of one or more organic solvent, based on the total weight of the barrier coating composition; wherein the poly vinyl alcohol or ethylene vinyl alcohol co-polymer has a molecular weight distribution of less than 16,000 Daltons; wherein the barrier coating composition has a solids content of 7.5% to 55% by weight and a coating viscosity of less than 30 seconds using Zahn cup #2 flow time at 23° C.; and wherein when the barrier coating composition is coated as a wet film follows a rule of:

$$wfm \div \% \ NVC \times \eta \leq 12,$$

wherein wfm is the wet film weight in grams per m$^2$;
% NVC is the percent by weight of dry polymer content of the barrier coating composition, and η is the viscosity of the coating expressed in seconds using Zahn cup #2 flow time at 23° C.

17. The method of claim 16, wherein the organic solvent is a lower alcohol.

18. The method of claim 16 further comprising adding to the aqueous mixture optionally a filler and/or extender pigment with an aspect ratio greater than 20.

19. A method of coating an article with a barrier against gas and/or nuisance substances comprising printing the barrier coating composition of claim 1 on said article.

20. The method of claim 19, wherein said barrier coating composition is printed in-line with a printing ink.

21. The method of claim 19, wherein said article comprises either a monoweb surface printed or laminate reverse printed structure.

* * * * *